Oct. 11, 1949. C. R. STOCK 2,484,761
VISCOSIMETER
Filed April 5, 1945 2 Sheets-Sheet 1
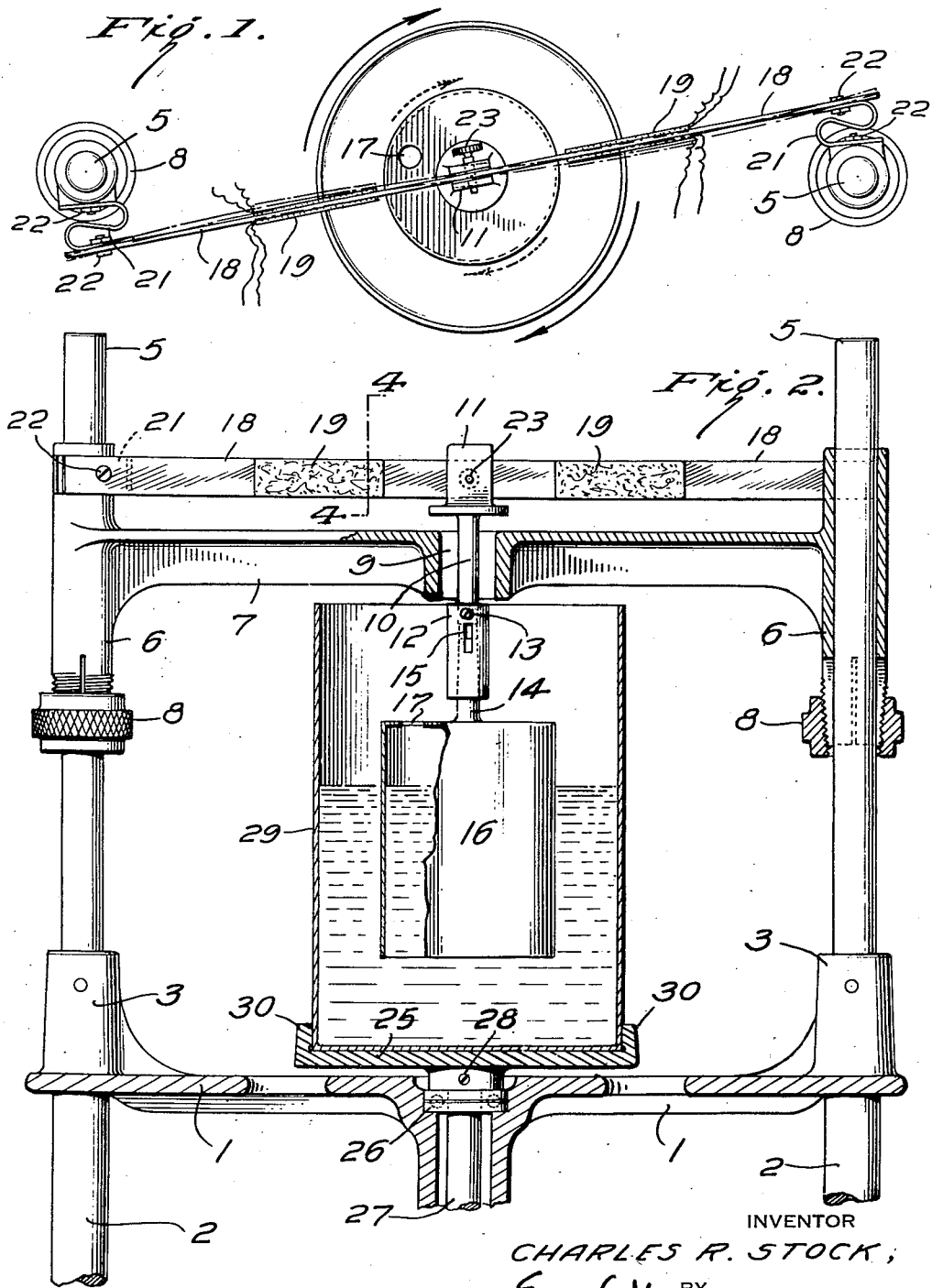
INVENTOR
CHARLES R. STOCK,
BY
ATTORNEY

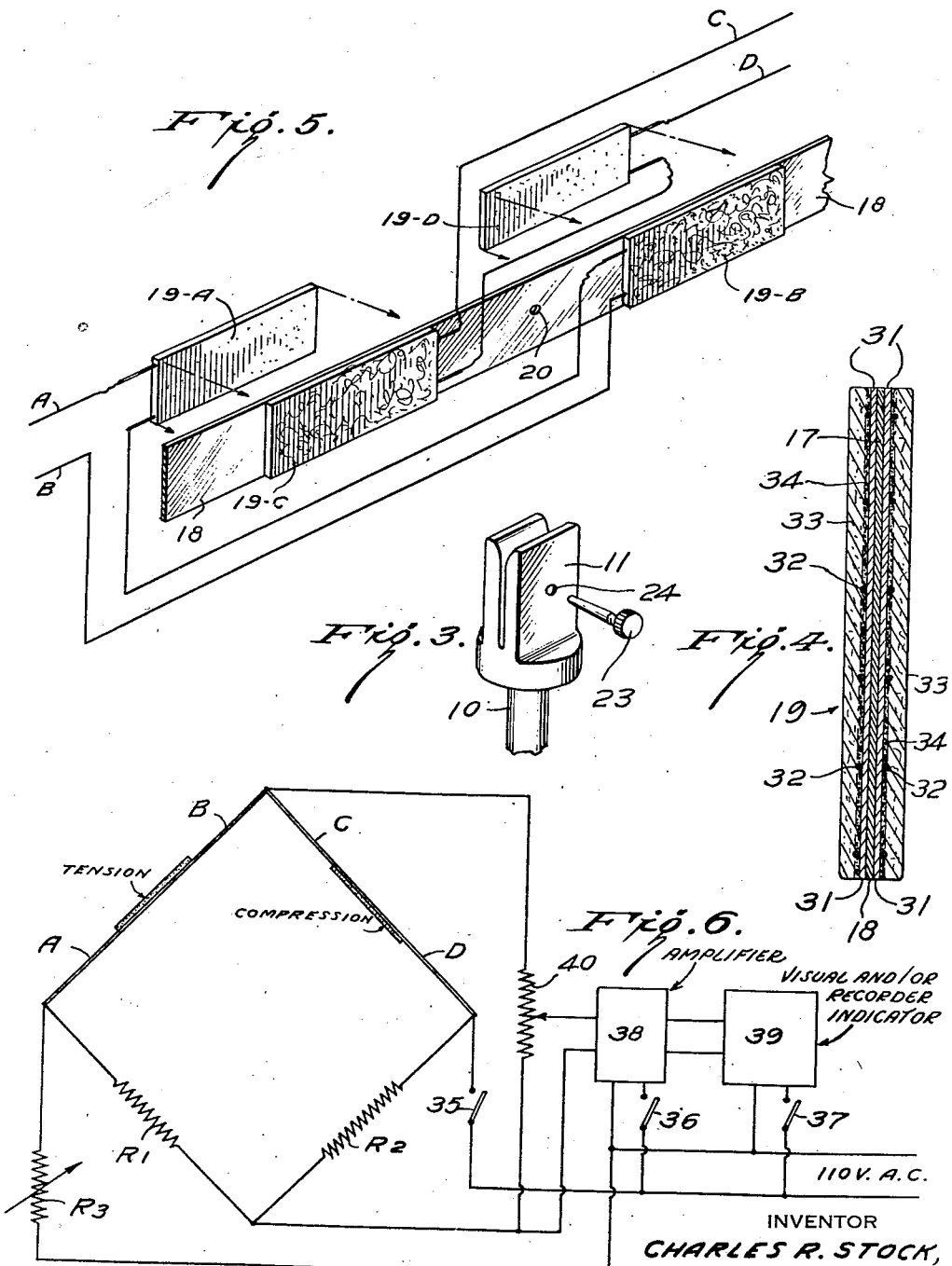

Patented Oct. 11, 1949

2,484,761

UNITED STATES PATENT OFFICE 2,484,761

VISCOSIMETER

Charles R. Stock, Greenwich, Conn., assignor to American Cyanamid Company, New York, N. Y., a corporation of Maine Application April 5, 1945, Serial No. 586,715

1 Claim. (Cl. 73—59)

This invention relates to viscosimeters and methods for measuring viscosities.

There are several viscosimeters in use today, but all have certain drawbacks and disadvantages which are overcome by the present invention. These viscosimeters, which carry recorders or indicators actuated by mechanical means resulting from the distortion of a spring or wire, are not as accurate or reliable as the viscosimeter of the present invention. Much of this inaccuracy results from friction in the mechanical indicator and/or stylus of a recorder. In addition, these known viscosimeters are subject to fatigue and have a narrow range of sensitivity which can be broadened or extended only by the interchanging of the springs or wires to be placed under strain with those which require more or less force for their distortion.

If materials of low viscosity are to be studied, present day instruments are not readily adapted for such measurements. In a rotating cup type viscosimeter in which the drag element is held by a weak spring to be distorted by torque, bearings are needed to center the drag element in an endeavor to secure accurate and reproducible results. However, the friction resulting from even the finest bearing gives variable results, and return to the original "zero reading" upon completion of the determination does not ofter occur. Without the bearings to center the drag element, no determination whatsoever can be made with this instrument because the drag element is pulled off center and extraneous vibrations are set up in the spring system carrying the drag element when the cup containing the sample to be tested rotates.

Other methods of measuring viscosity, such as timing the vertical fall of a sphere of known mass through a column of liquid, or the flow of a known amount of liquid through a small aperture, may not rely on recorders or indicators but on the human eye for observation and upon a manually operated timer. The data so obtained must then be converted by computation to determine the viscosity. Errors in this method result, and reproducibility is dependent upon the perceptive powers and reflexes of the operator.

These and other disadvantages may be overcome by the measurement of viscosity using the means and method of the present invention.

The invention, therefore, has as a principal object the elimination of the drawbacks and disadvantages which are inherent in the known methods and instruments for measuring viscosity. The visual indicators and/or recorders actuated by mechanical means are replaced by electrically operated instruments which are energized from an independent source of electric power. No energy is removed from the viscosimeter since no frictional losses are involved. The determination of viscosity by the present invention is not dependent on the perceptive powers or reflexes of an operator, and the values obtained are reproducible. The instrument of the present invention is not subject to fatigue as are those which rely on the distortion of sensitive springs or wires. In addition, the sensitivity range is broad, so that one element subject to distortion will suffice to absorb the drag exerted by many kinds of materials whose viscosities vary over a wide range.

More particularly the invention contemplates measuring the resistance in an electrical resistance strain gauge attached to a bar when the gauge is under strain, and determining the difference in its resistance under strain and not under strain. Such a strain is the result of the drag exerted on the drag member partially or completely immersed in a substance under test by that substance when relative rotation between the two is in progress. The drag thus impressed on the drag member is transmitted over a connecting means to the bar carrying an electrical resistance strain gauge. Since the strain gauge is intimately attached to the fixed bar, the strains developed therein result in a change in resistance in the strain gauge. A change in resistance causes a balanced electrical circuit to become unbalanced. The change in resistance is measured by a sensitive bridge circuit and such measurements are then converted and calculated to give units of viscosity. Proper calibration of the instrument enables the operator to read the viscosity directly. This invention is unique in that errors common to other methods for determining viscosity are eliminated.

A further advantage contemplated by this invention is the elimination of sources of friction which previously have given rise to errors. Instead of bearings the drag element is attached to a bar and may hang therefrom without contacting any material other than the substance to be tested. An end of the bar may be held and fastened to a support by an element or guide, which, like the bar, is of elastically deformable material, and permits a lengthwise movement of said end when the bar is under torque. The end support and the bar are of sufficient strength and rigidity so that the drag element is securely supported thereby.

A more specific and preferred embodiment of the present invention is an elastically deformable bar member elastically supported at both ends and carrying a centered drag element assembly. Although the latter is preferred to be centered because calibration is simplified, it may be placed anywhere along the bar member. If it is at one end, the outer limit to which the drag element assembly may be moved, the more general embodiment already described would be obtained.

Although the preferred number of strain gauges, which is illustrated in the drawings, is four, it should be understood that two strain gauges attached to the bar and connected in a bridge circuit, as will be described, is sufficient to make adequate viscosity determinations. The sensitivity of a viscosimeter is increased by using additional strain gauges, and more than four gauges may be used.

The invention further includes the novel construction, combination, and arrangement of parts and the manner of use as more fully hereinafter pointed out in the description and shown in the drawings:

Fig. 1 is a top plan view of an assembly constructed according to the present invention showing a preferred arrangement of the strain gauges.

Fig. 2 is a front elevation of a preferred embodiment.

Fig. 3 is a fragmentary perspective of the bifurcated element.

Fig. 4 is a sectional view along the line 4—4 of Fig. 2, in which the electrical resistance strain gauges are enlarged to facilitate illustration.

Fig. 5 is a fragmentary perspective showing the arrangement of a preferred number of strain gauges and their electrical hook up, in which one pair of gauges is separated from the bar member to facilitate illustration.

Fig. 6 is a diagrammatic showing of a preferred electrical layout.

Referring now to the drawings, a base is shown at 1 supported on legs 2, and carrying hollow studs 3 which hold posts 5 in a vertical position. Hollow brackets 6 carrying the strengthening frame 7 ride on the posts 5 and are locked at a desired elevation by the clamping nuts 8.

The supporting frame 7 adds strength and rigidity to the assembly and carries an opening 9 through which passes a connecting shaft 10 which has a bifurcated element 11 at the top thereof and a connecting sleeve 12 attached to the opposite end.

The sleeve 12 is fixed to the shaft 10 by a set screw 13, and is provided with a tapered recess adapted to accept a similarly tapered finger 14 frictionally held therein. The finger may be removed from its socket by inserting a tool into the recess 15 and rocking the tool against the exposed end of the finger. The finger 14 is connected to the drag element, preferably a hollow cylinder, 16 which carries an air vent 17. A solid cylinder may be used, and if so, the vent 17 is not needed.

A bar member 18 of elastically deformable material carries two or more electrical resistance strain gauges, indicated generally at 19, and electrically connected as will be more fully described hereinafter. The middle portion of the bar 18 having a centered hole 20 (see also Fig. 5) is set into the tight fitting bifurcated element 11, and the ends are held in a fixed position by strong supporting guides of elastically deformable material 21 attached to the brackets 6. The guides 21 are firmly attached to the bar 18 and bracket 6 by means of locking bolts and nuts 22. The bar member 18 is held in the bifurcated element 11 by a taper pin 23 which passes through a pair of holes 24 (see Fig. 3) in the bifurcated element and the centered hole 20 (see Fig. 5) in the bar member. It is preferred that the strain gauges 19 be equidistant from the centered hole 20 so that when the complete assembly is under load as a result of being in operation, the amount of strain exerted on the strain gauges is substantially equal, and calibration of the instrument is simplified. When the once-calibrated instrument is dismantled for cleaning, shipment, or repairs, it is essential, in order to avoid recalibration after each reassembly, that the bar member assumes the position it previously occupied. By means of the centering and/or clamping device described above, it is unnecessary to recalibrate the viscosimeter after each dismantling because the bar member is always returnable to the same location in bifurcated element. The dotted lines in Fig. 1 show a position occupied by the bar member 18 when the latter is under strain as a result of the rotation of turntable 25 in the direction indicated.

In base 1 a thrust bearing 26 is mounted, through which passes a drive shaft 27 attached to the turntable 25 and held fast thereto by means of a set screw 28. The shaft 27 is connected to any suitable means, such as an electric motor (not shown), for causing the turntable 25 to rotate in either direction. A vessel 29, which is adapted for carrying a sample under test, is frictionally held in a fixed position on the turntable 25 by means of the ridge 30 which extends around the perimeter of the vessel 29.

Referring in particular to Fig. 4, it will be seen that a pair of strain gauges 19 are mounted by adhesive or the like to the bar 18. The parts of the strain gauges are of usual construction and as seen in Fig. 4, consist of a backing 31, resistance wire 32, a covering 33, and adhesive material 34 which holds these three component parts together as a unit.

Referring in particular to Fig. 5, a preferred combination of four strain gauges 19–A, 19–B, 19–C, and 19–D is shown. When the bar member 18 is under strain, the resultant torque causes two gauges to undergo tension and two, compression. It is preferred that the strain gauges which undergo tension be electrically connected in series. The same is also preferred for those strain gauges which are under compression. For illustrative purposes it will be assumed that the drag member tends to rotate clockwise and thus force the bar member to assume the position shown in dotted lines in Fig. 1. Such being the case, gauges 19–C and 19–D would be under compression, and these gauges, having leads C and D, are electrically connected in series. Gauges 19–A and 19–B, having leads A and B, are likewise electrically connected and would be under tension. These letters have the same meaning in Fig. 6.

Referring in particular to Fig. 6, a preferred bridge circuit is shown. The strain gauges 19–A and 19–B are noted as "Tension" and the connecting leads A and B are shown in the circuit. The corresponding "Compression" gauges and their leads C and D are also shown in the circuit. $R_1$ and $R_2$ are fixed resistances and $R_3$ is a variable resistance. Switches 35, 36 and 37 control the supply of current to the bridge circuit, amplifier 38, and indicator 39 of any suitable type, all as is well known. The sensitivity of the circuit, and thereby that of the viscosimeter of the present invention, is regulated by the potentiometer 40 and the variable resistance R3. The indicator 39 may be either a visual or recording type and either may be used with success.

The present invention further contemplates that a sample of a material whose viscosity is to be determined be placed in the cup so designated for that purpose. The cup is then placed on the turntable, and a ridge thereon which extends around the perimeter of the base of the cup and makes a tight frictional fit therewith holds the cup in place. The bracket assembly carrying a cylindrical drag member, preferably hollow, connecting shaft, and a fixed elastically deformable bar complete with one or more electrically connected strain gauges, is lowered down the supporting posts and locked into place with clamping nuts when the hollow cylinder is partially or completely immersed in the material under test. Any trapped air is vented through an opening provided for this purpose.

After the various elements of the viscosimeter are in their proper position, the turntable carrying the cup and sample therein is rotated, preferably by means of an electric motor. The direction of rotation is immaterial, and as the cup containing the test sample rotates, a drag is set up between the sample under test and the drag member immersed therein.

The torque thus impressed on the cylinder is transmitted over the shaft to the elastically deformable bar carrying electrical resistance strain gauges. Under such a strain caused by the drag on the cylinder, hollow or solid, the strain gauges are deformed.

When a strain gauge is deformed, its resistance changes, and this change unbalances a sensitive bridge circuit causing a current to flow. This flow is usually very slight and it is preferred that it be amplified prior to being fed into an indicator, either a visual or recording type, where it is measured.

Calibration of the viscosimeter so that the viscosity may be read directly may be done in two ways. The resistance change and conversion to units of viscosity can be calculated by well known mathematical methods. Another method is to determine the resistance changes for materials having known viscosities. Knowing these values, it is a simple matter to plot a calibration curve for the instrument, and having such a curve facilitates the determination of the viscosities of other substances.

While the invention has been described with particular reference to specific embodiments, it is to be understood that it is not to be limited thereto but is to be construed broadly and restricted solely by the scope of the appended claim.

What is claimed is:

In combination, a vessel adapted to contain a substance the viscosity of which is to be determined, an inverted cup drag member within the vessel and adapted to dip into the liquid under test, a vertical shaft fixed to the drag member and extending upwardly therefrom, an elastically deformable cantilever bar which extends horizontally on each side of the shaft and secured to the shaft, a fixed post adjacent each end portion of the cantilever bar, flexible means connecting each end portion of the bar with a post, an electric resistance strain gauge mounted on said bar, an instrument electrically connected to said strain gauge and responsive to changes in the electrical resistance of the strain gauge when stressed, and means to rotate the vessel, whereby when the vessel contains a liquid material under test, the cup drag member dips into the liquid and the vessel is rotated, the bar tends to rotate in the same direction as the test material, thus putting the strain gauge under stress.

CHARLES R. STOCK.

REFERENCES CITED

The following references are of record in the file of this patent:

UNITED STATES PATENTS

| Number | Name | Date |
| --- | --- | --- |
| 1,281,042 | MacMichael | Oct. 8, 1918 |
| 1,960,225 | Shoenberg | May 22, 1934 |
| 2,096,222 | Bock | Oct. 19, 1937 |
| 2,122,765 | Weiler | July 5, 1938 |
| 2,252,464 | Kearns et al. | Aug. 12, 1941 |
| 2,316,975 | Ruge | Apr. 20, 1943 |
| 2,340,992 | Siegel | Feb. 8, 1944 |
| 2,344,331 | Swift et al. | Mar. 14, 1944 |
| 2,359,245 | Ritzmann | Sept. 26, 1944 |
| 2,403,952 | Ruge | July 16, 1946 |

FOREIGN PATENTS

| Number | Country | Date |
| --- | --- | --- |
| 549,140 | Great Britain | Nov. 9, 1942 |